(12) United States Patent
Sogabe et al.

(10) Patent No.: US 6,847,497 B2
(45) Date of Patent: Jan. 25, 2005

(54) WIDE-ANGLE IMAGING DEVICE

(75) Inventors: Yasushi Sogabe, Nishinomiya (JP); Shigeki Murata, Nara (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/399,682

(22) PCT Filed: Oct. 4, 2001

(86) PCT No.: PCT/JP01/08778
§ 371 (c)(1),
(2), (4) Date: Apr. 21, 2003

(87) PCT Pub. No.: WO02/35285
PCT Pub. Date: May 2, 2002

(65) Prior Publication Data
US 2004/0027689 A1 Feb. 12, 2004

(30) Foreign Application Priority Data
Oct. 20, 2000 (JP) .................................. 2000-320119
Sep. 25, 2001 (JP) .................................. 2001-290313

(51) Int. Cl.[7] .......................................... G02B 17/00
(52) U.S. Cl. ................................. 359/726; 359/868
(58) Field of Search ................. 359/725, 726, 359/728, 857, 868

(56) References Cited

U.S. PATENT DOCUMENTS

| 2,299,682 A | 10/1942 | Conant | 396/351 |
|---|---|---|---|
| 4,170,400 A | 10/1979 | Bach et al. | 385/119 |
| 6,375,366 B1 * | 4/2002 | Kato et al. | 396/351 |
| 6,545,702 B1 * | 4/2003 | Konolige et al. | 348/36 |
| 2002/0006000 A1 * | 1/2002 | Kumata et al. | 359/853 |
| 2002/0141636 A1 * | 10/2002 | Wakamoto et al. | 382/154 |

FOREIGN PATENT DOCUMENTS

| EP | 0 833 178 A1 | 4/1998 |
|---|---|---|
| JP | 53-124426 | 3/1952 |
| JP | 59-60651 | 4/1984 |
| JP | 2-151828 | 6/1990 |
| JP | 4-152765 | 5/1992 |
| JP | 6-295333 | 10/1994 |
| JP | 8-32845 | 2/1996 |
| JP | 8-111798 | 4/1996 |
| JP | 2000-98457 | 4/2000 |
| JP | 2000-131738 | 5/2000 |
| JP | 2000-152218 | 5/2000 |
| JP | 2000-206835 | 7/2000 |
| JP | 2000-341568 | 12/2000 |

* cited by examiner

Primary Examiner—Georgia Epps
Assistant Examiner—Darryl J. Collins
(74) Attorney, Agent, or Firm—Parkhurst & Wendel, L.L.P.

(57) ABSTRACT

A wide-angle imaging device suitable for a monitor area of about 180 degrees. A first reflection mirror (1) is provided that has, around the rotation center axis (6) of a rotary symmetrical body, a reflection surface having an approximately ±90-degree convex shape with respect to a reference optical axis direction, an image forming lens (2) that has a principal point (7) on the rotation center axis of the first reflection mirror (1) and forms the image of a reflection beam from the first reflection mirror (1) and an imaging element (3) are disposed, and an object within approximately ±90 degrees around the rotation center axis of the first reflection mirror (1) is imaged.

9 Claims, 16 Drawing Sheets

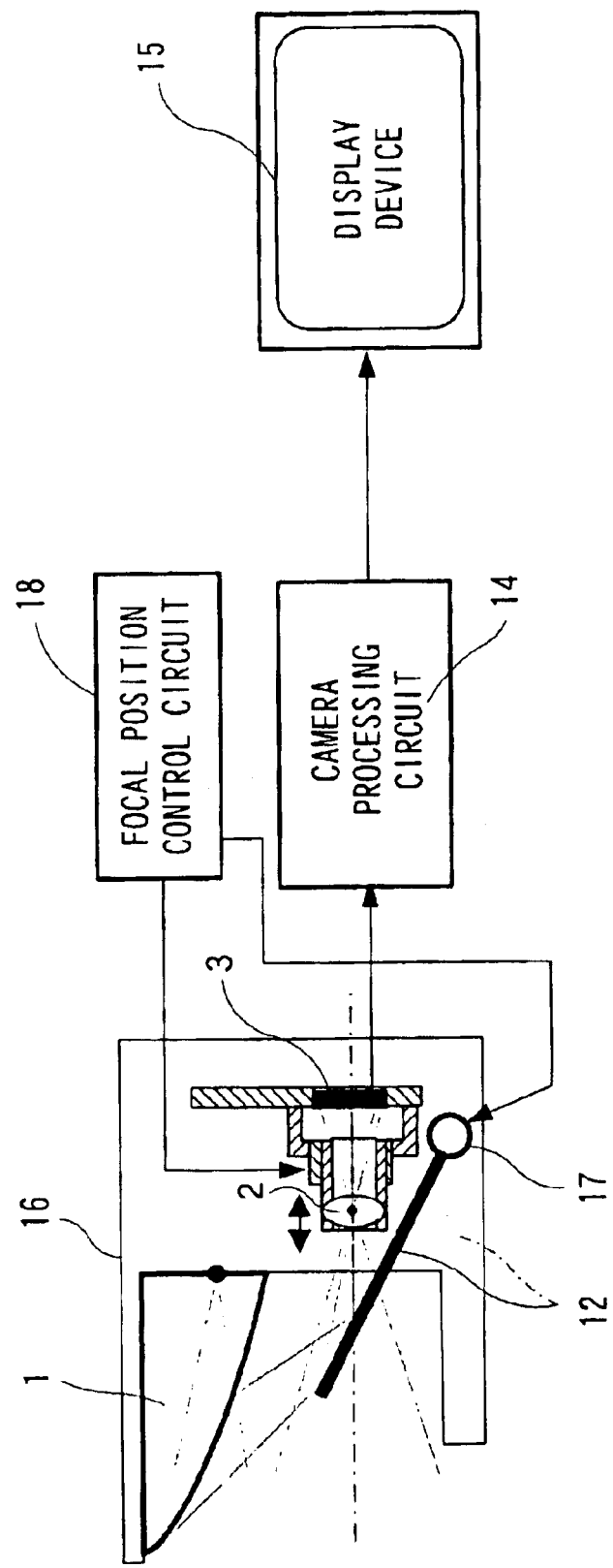

WIDE-ANGLE IMAGING DEVICE

TECHNICAL FIELD

The present invention relates to a wide-angle imaging device for imaging a reflection beam from a reflection surface.

BACKGROUND ART

As a camera for imaging a wide angle field, a fish-eye camera is available. The fish-eye camera can take an image of a hemispherical area around an optical axis by using a plurality of lenses having a high curvature.

As a wide-angle camera device using a reflection surface, a so-called omnidirectional camera disclosed in Japanese Patent No. 2939087 is available. With a reflection surface having an axial rotary symmetrical shape around the optical axis of the camera, an image of 360 degrees around the rotation axis can be formed on an imaging surface at a time.

A fish-eye camera has a special optical system for forming a fish-eye image, and the lens has a complicated shape and is expensive. Further, since an image taken by a fish-eye camera is different in distortion degree between the center and the periphery, the center and the periphery of the image taken by the fish-eye camera are quite different in distortion amount, resulting in a strange image.

Meanwhile, the omnidirectional camera using a reflection surface can take an image of 360 degrees at a time and can generate a panoramic image by image conversion.

Although such an omnidirectional camera is useful for a monitor area of 360 degrees, in the case of a monitor area of about 180 degrees, the omnidirectional camera has a number of unused pixels in an imaging element, resulting in inefficiency.

To be specific, since the omnidirectional camera takes an image of 360 degrees as a circular image, when an image is formed on a rectangular imaging surface (e.g., CCD), the image needs to be formed as a circle whose diameter is a short side of the rectangle, resulting in a number of unused pixels. For example, when it is assumed that an image is formed on a CCD surface having an aspect ratio of 4:3, a range usable as an image is just 59% of the entire CCD area because the image is a circle having the short side (:3) as a diameter, which is inefficient.

Moreover, since an image reflected once is imaged, the image is flipped and thus it is difficult to directly recognize the state from the taken image.

DISCLOSURE OF THE INVENTION

The present invention has as its objective the provision of a wide-angle imaging device which is suitable for a monitor area of approximately 180 degrees or more than 180 degrees.

A wide-angle imaging device of the first invention, comprises a first reflection mirror having a reflection surface of an approximately ±90-degree convex shape around the rotation center axis of a rotary symmetrical body with respect to a reference optical axis direction, and an imaging device which has a principle point of an image forming lens on a rotation center axis of the first reflection mirror, has an optical axis deviated from the rotation center axis of the first reflection mirror, forms an image of a reflection beam from the first reflection mirror, and images an object within approximately ±90 degrees around the rotation center axis of the first reflection mirror, wherein the first reflection mirror is a hyperboloid in shape having an internal focus on the rotation center axis, a position of an external focus of the hyperboloid and a position of a principle point of the imaging device substantially coincide with each other, and when the imaging device has an angle field of $2\alpha$, an angle of about $\alpha$ is formed between the optical axis of the imaging device and the rotation center axis of the first reflection mirror, and further, the imaging surface of the imaging device is rectangle and has a long side and a short side, the rotation axis center of the first reflection mirror forms an image substantially on a midpoint of the long side of the imaging surface, and a semicircular reflection beam from the first reflection mirror has a diameter equal to the long side of the imaging surface.

A wide-range imaging device of the second invention, comprises a first reflection mirror having a reflection surface of an approximately ±90-degree convex shape around a rotation center axis of a rotary symmetrical body with respect to an arbitrary reference optical axis direction, a second reflection mirror located on a rotation center axis of the first reflection mirror and changes an optical path of a reflection beam from the first reflection mirror in an opposite direction from the reference optical axis, and an imaging device that forms an image of a reflection beam having an optical path changed by the second reflection mirror, the reflection beam having an optical axis being directed to the second reflection mirror instead of coinciding with the rotation center axis of the first reflection mirror, so that an object is imaged within approximately ±90 degrees around the rotation center axis of the first reflection mirror, wherein the first reflection mirror is a hyperboloid in shape having an internal focus on the rotation center axis, and a position of an external focus of the hyperboloid and a position of a principle point of an image forming lens of the imaging device substantially coincide with each other, the external focus being changed in position by the second reflection mirror, the optical axis of the imaging device substantially intersects the rotation center axis of the first reflection mirror and substantially coincides with an approximately 180-degree direction with respect to the reference optical axis direction of the first reflection mirror, and when the imaging device has an angle field of $2\alpha$ in the rotation center axis direction of the first reflection mirror, a normal to a surface of the second reflection mirror and the optical axis of the imaging device form a narrow angle of about $45+(\alpha/2)$ degrees, and further the imaging surface of the imaging device is rectangle and has a long side and a short side, the rotation axis center of the first reflection mirror forms an image substantially on a midpoint of the long side of the imaging surface, and a semicircular reflection beam from the first reflection mirror has a diameter equal to the long side of the imaging surface.

A wide-range imaging device of the third invention, comprises a first reflection mirror having a reflection surface of an approximately ±90-degree convex shape around a rotation center axis of a rotary symmetrical body with respect to an arbitrary reference optical axis direction, a second reflection mirror located on a rotation center axis of the first reflection mirror and changes the optical path of a reflection beam from the first reflection mirror in an opposite direction from the reference optical axis, and an imaging device that forms an image of a reflection beam having an optical path changed by the second reflection mirror, the reflection beam having an optical axis being directed to the second reflection mirror instead of coinciding with the rotation center axis of the first reflection mirror, so that an object is imaged within approximately ±90 degrees around the rotation center axis of the first reflection mirror, wherein the imaging device further comprises a moving device for moving the second reflection mirror, and the second reflection mirror is moved to directly image an object by the imaging device without forming an image of a reflection beam from the first reflection mirror in the imaging device.

A wide-range imaging device of the fourth present invention is such as defined in the third present invention, wherein the imaging device further comprises an adjusting device for adjusting a focal position according to a position of the second reflection mirror moved by the moving device.

A wide-range imaging device of the fifth present invention comprises a first reflection mirror having a reflection surface of an approximately ±90-degree convex shape around the rotation center axis of a rotary symmetrical body with respect to a reference optical axis direction, a second reflection mirror located on the rotation center axis of the first reflection mirror and changes the optical path of a reflection beam from the first reflection mirror to the reference optical axis direction, and an imaging device that has its optical axis not aligned with the rotation center axis of the first reflection mirror and faces the second reflection mirror to form an image of a reflection beam having an optical path changed by the second reflection mirror and images an object within approximately ±90 degrees around the rotation center axis of the first reflection mirror, wherein the first reflection mirror is a hyperboloid in shape having an internal focus on the rotation center axis, and the position of an external focus of the hyperboloid and the position of a principle point of the image forming lens of the imaging device substantially coincide with each other, the external focus being changed in position by the second reflection mirror, wherein the first reflection mirror, the second reflection mirror, and the imaging device are included in a space within approximately ±90 degrees around the rotation center axis of the rotary symmetrical body with respect to the reference optical axis direction, and wherein the imaging device has an imaging surface that is rectangle and has a long side and a short side, the rotation axis center of the first reflection mirror forms an image substantially on a midpoint of the long side of the imaging surface, and a semicircular reflection beam from the first reflection mirror has a diameter equal to the long side of the imaging surface.

A wide range imaging device of the sixth present invention is such as defined in any one of the first to fifth inventions, wherein the imaging device comprises a camera processing circuit that scans only an effective area on the imaging surface of the imaging device having imaged an object within approximately ±90 degrees around the rotation center axis of the first reflection mirror, performs geometrical transformation on an image of the effective area, and outputs the image.

A wide range imaging device of the seventh present invention is such as defined in the sixth invention, wherein the camera processing circuit completes the geometrical transformation within a time for scanning an unnecessary areas other than the effective area.

A wide range imaging device of the eighth present invention comprises a first reflection mirror having a reflection surface of a convex shape exceeding 180 degrees around a rotation center axis of a rotary symmetrical body with respect to a reference optical axis direction, and an imaging device that has a principle point of an image forming lens on a rotation center axis of the first reflection mirror, has an optical axis deviated from the rotation center axis of the first reflection mirror, forms an image of a reflection beam from the first reflection mirror, and forms an image, wherein the rotation axis center of the first reflection mirror forms an image substantially on a midpoint in a long side direction of the imaging surface, and a circular reflection beam from the first reflection mirror has a diameter substantially equal to a length of the long side of the imaging surface, and when the imaging surface of the imaging device has an angle field $2\alpha$ in a short side direction and the imaging surface of the imaging device has a long side n and a short side m, the optical axis of the imaging device and the rotation center axis of the first reflection mirror form an angle $\beta$ satisfying the equation of $\tan\beta=[(n/m)-1]\cdot\tan\alpha$.

In claim 17, a wide-angle imaging device according to claim 18 of the present invention comprises a camera processing circuit which retrieves an image of an area on the imaging surface, performs geometrical transformation on the image, and outputs the image, the image being formed from an object within approximately ±(90+γ) degrees around the rotation center axis of the first reflection mirror, wherein $\sin\gamma=(2m-n)/n$ is established.

BRIEF DESCRIPTION OF THE DRAWINGS

FIG. 11 is a schematic diagram showing a wide-angle imaging device according to (Embodiment 4) of the present invention;

BEST MODE FOR CARRYING OUT THE INVENTION

Referring to FIGS. 1 to 27, the following will discuss embodiments of the present invention.

(Embodiment 1)

FIGS. 1 to 4 show a wide-angle imaging device according to (Embodiment 1) of the present invention.

Figure 1:
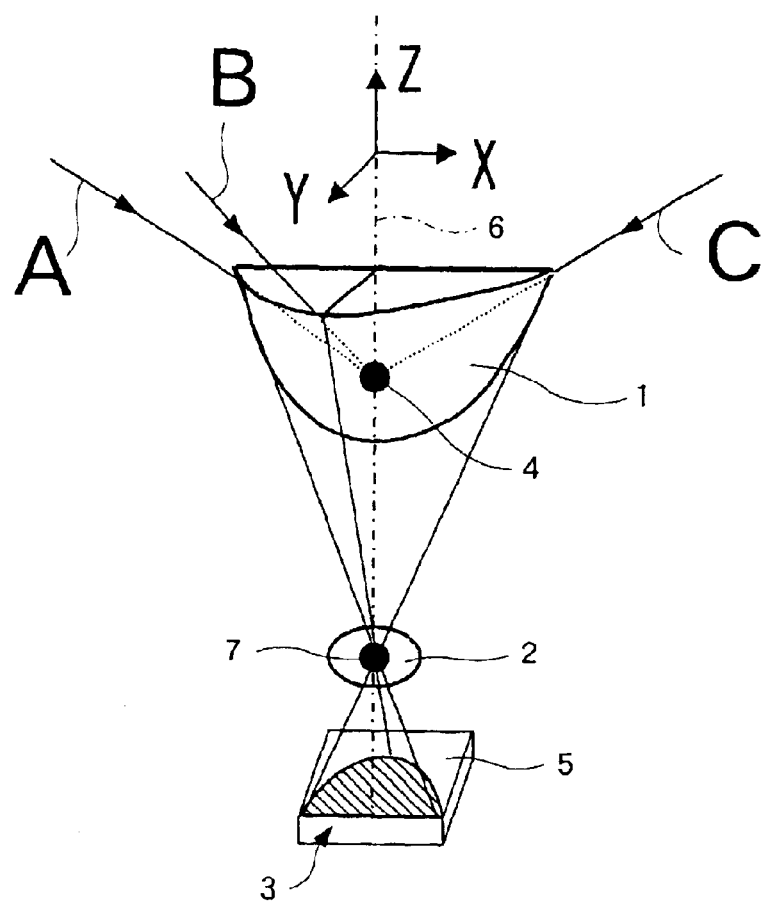
FIG. 1 is a schematic perspective view showing a wide-angle imaging device according to (Embodiment 1) of the present invention.

The wide-angle imaging device of (Embodiment 1) shown in FIG. 1 is constituted by a reflection mirror 1, an image forming lens 2, and an imaging element 3. An imaging device is constituted by the image forming lens 2 and the imaging element 3.

The reflection mirror 1 has a reflection surface having an approximately ±90-degree convex shape around a rotation center axis of a rotary symmetrical body. As shown in FIG. 1, the reflection mirror 1 is a hyperboloidal hemisphere. Light beams A, B, and C emitted to an internal focus 4 on the rotation center axis of the reflection mirror 1 are reflected downward via the reflection mirror 1 in FIG. 1 and the image of the light beams is formed on an imaging surface 5 of the imaging element 3 via the image forming lens 2.

Reference numeral 6 denotes a rotation center axis of the reflection mirror 6 that has a hyperboloid and is disposed on the Z axis. The image forming lens 2 has a principle point 7 on the Z axis, that is, on the rotation center axis 6 of the hyperboloid.

Figure 2:
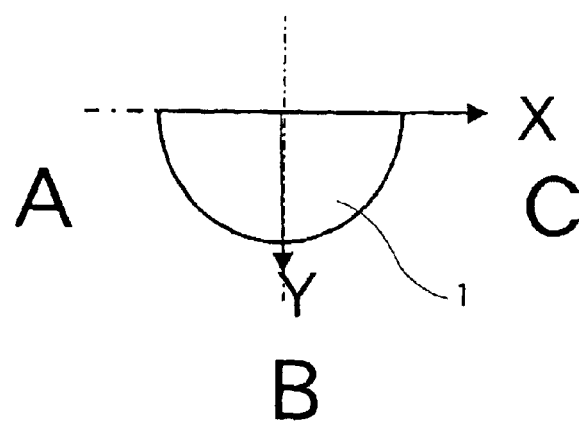
FIG. 2 is a phase diagram indicating a position of an object imaged by the wide-angle imaging device of (Embodiment 1), with the wide-angle imaging device of FIG. 1 being observed in the Z axis direction.

The light beams A, B, and C are models for explaining light beams from objects. The light beams A, B, and C will be regarded as objects and will be referred to as objects A, B, and C in the following explanation. In the state of FIG. 2 where the wide-angle imaging device of FIG. 1 is observed in the Z-axis direction, the object A, the object B, and the object C are disposed within an area of ±90 degrees around the Z axis with respect to the Y axis direction (reference optical axis direction).

Since the reflection mirror 1 is a hyperboloid in shape, light beams emitted to the internal focus 4 on the rotation center axis 6 are reflected on the reflection mirror 1 and are all condensed on an external focus of the hyperboloid. Since the external focus of the hyperboloid and the principle point 7 of the image forming lens coincides with each other, all light beams directed to the internal focus 4 form images on the imaging surface 5.

Since the reflection mirror 1 has a hemispherical reflection part, that is, a reflection part of 180 degrees around the rotation center axis 6, an object of 180 degrees around the rotation center axis 6 forms a semicircular image on the imaging surface. Namely, an angle field of 180 degrees is provided.

Therefore, even when the objects A, B, and C are disposed as shown in FIG. 2, all the objects can be imaged because the angle field is 180 degrees.

Figure 3:
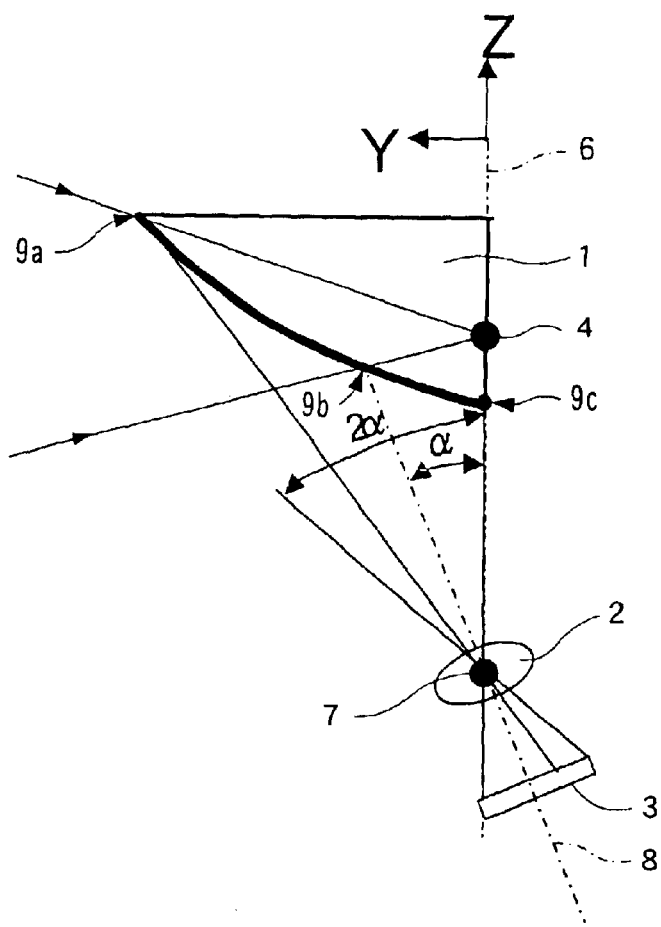
FIG. 3 shows a side section taken along line Y-Z of FIG. 1.
Figure 4:
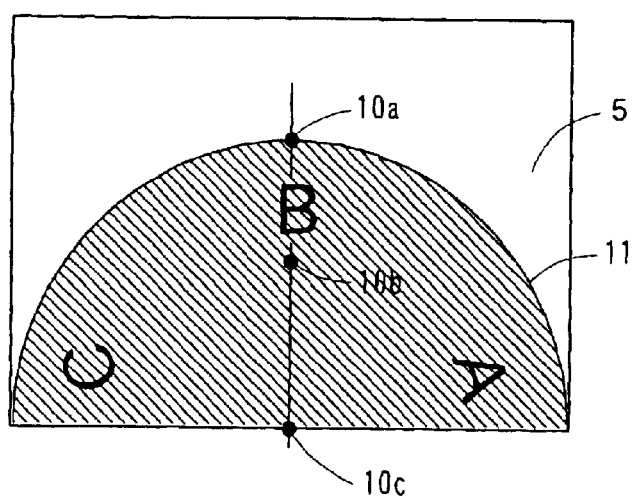
FIG. 4 is an enlarged plan view showing an imaging surface of an imaging element of the embodiment.

Referring to FIGS. 3 and 4, the following will discuss how an image with an angle field of 180 degrees is formed on the imaging surface 5.

FIG. 3 shows an optical arrangement of the wide-angle imaging device of (Embodiment 1) and is a sectional view taken along line Y-Z of FIG. 1.

Reference numeral 8 denotes an optical axis of the image forming lens 2, and reference numeral 2α denotes an angle field of the image forming lens 2. An angle formed by the rotation center axis 6 and the optical axis 8 of the image forming lens 2 is α, which is half the angle field 2α. To be specific, α is approximately 15 to 30 degrees.

With this arrangement, reflection beams from points 9a, 9b, and 9c on the reflection mirror 1 pass through the image forming lens 2 and form images on the imaging surface 5. Reference numeral 9a denotes an endpoint in the Y-axis direction of the reflection mirror 1.

FIG. 4 is a schematic view showing an image-forming state on the imaging surface of the wide-angle imaging device of (Embodiment 1). A diagonally shaded area shows an image formed by refection of the reflection mirror 1, and reference characters A, B, and C denote the positions of forming the images of the objects shown in FIG. 1.

In FIG. 3, a reflection beam from the endpoint 9a passes through the image forming lens 2 and the image of the beam is formed on a position 10a of the imaging surface 5. A point 9b indicates an intersection point of the reflection mirror 1 and the optical axis 8. A reflection beam from the point 9b is similarly forms an image on a position 10b of the imaging surface 5. A point 9c indicates the top of the reflection mirror 1, and a reflection beam from the point 9c forms an image on a position 10c of the imaging surface 5.

As a result, an image having an angle field of 180 degrees is formed like a semicircle. Further, a magnification of the image forming lens 2 is selected so that a diameter of the semicircular image substantially coincides with a length of the imaging surface 5 with respect to the X direction. Thus, as shown in FIG. 4, a semicircular image 11 is formed on the imaging surface 5. This arrangement is the most efficient when a semicircular image is formed on the rectangular imaging surface 5.

Therefore, according to the present embodiment, an image having an angle field of 180 degrees can be imaged at a time and an image having an angle field of 180 degrees can be effectively arranged on the rectangular imaging surface.

Figure 5:
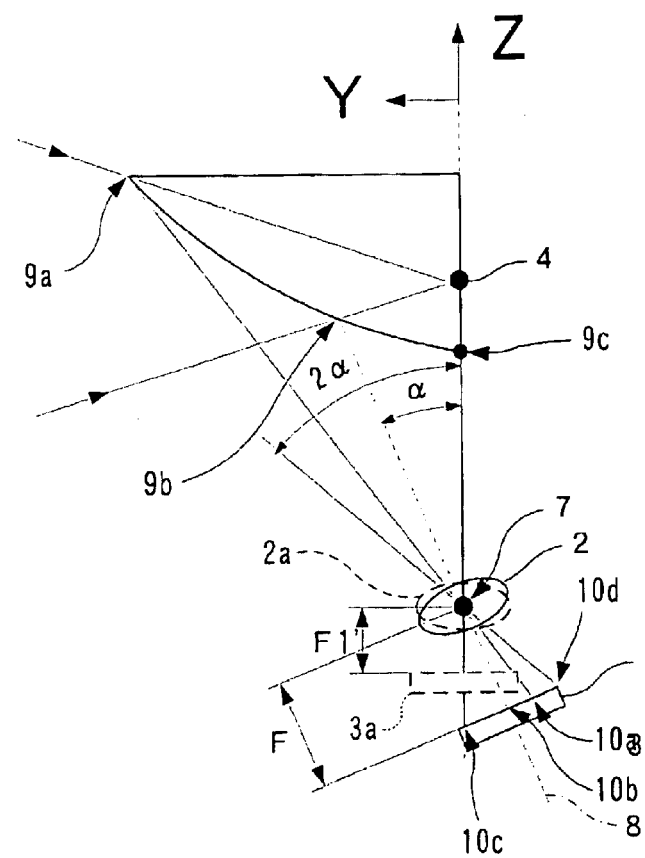
FIG. 5 shows a side section taken along line Y-Z of FIG. 1 to compare the embodiment with a conventional art.

FIG. 5 shows the arrangement of an image forming lens 2a and the arrangement of an imaging element 3a in an overlaying manner when a conventional omnidirectional camera is used in a monitor area of about 180 degrees, in FIG. 4, which shows (Embodiment 1). In the conventional omnidirectional camera, a rotation center axis 6 of a reflection mirror 1 and an optical axis of an imaging element 3 coincide with each other, and the imaging element 3a is disposed at a position where a reflection beam from the endpoint 9a of the reflection mirror 1 forms an image on an endpoint 10d of a minor axis of the imaging surface 5.

Figure 6:
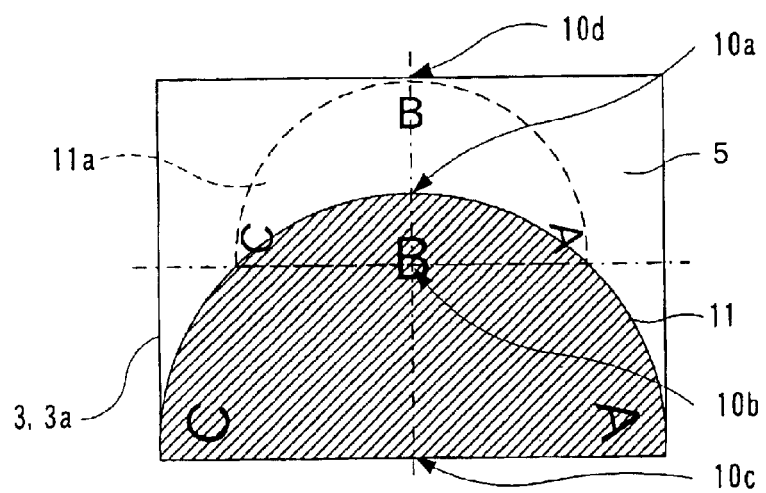
FIG. 6 is an enlarged plan view showing the imaging surface of the imaging element to compare the embodiment with the conventional art.

In FIG. 6, in contrast to the semicircular image 11 of (Embodiment 1), an image of the conventional omnidirectional camera that is formed by the image forming lens 2a and the imaging element 3a results in a number of unused pixels on the imaging element 3a just like an image 11a. Thus, the conventional omnidirectional camera is inefficient as compared with (Embodiment 1). In the case of an imaging surface having an aspect ratio of 4:3, while a used area with an angle field of 180 degrees is about 30% in the conventional omnidirectional camera, (Embodiment 1) has an angle field of about 52%, which increases a used area by 22% and thus improves the picture quality.

(Embodiment 2)

Figure 7:
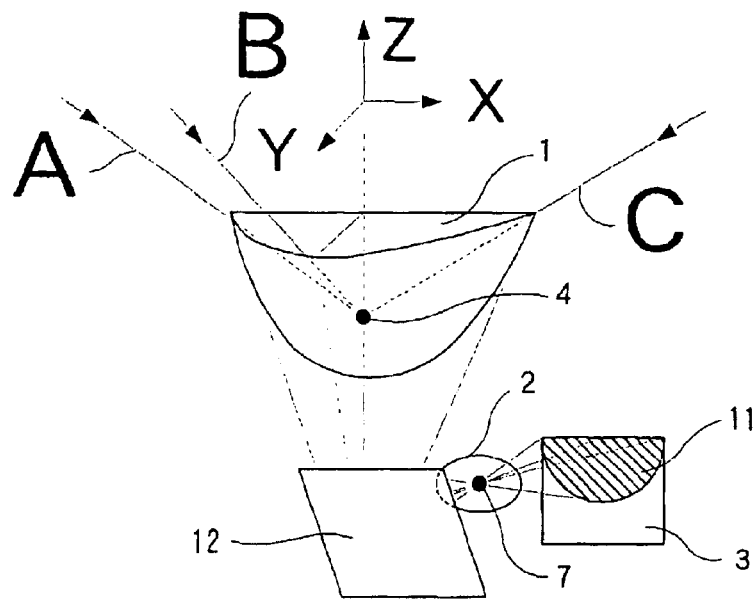
FIG. 7 is a schematic perspective view showing a wide-angle imaging device according to (Embodiment 2) of the present invention.
Figure 8:
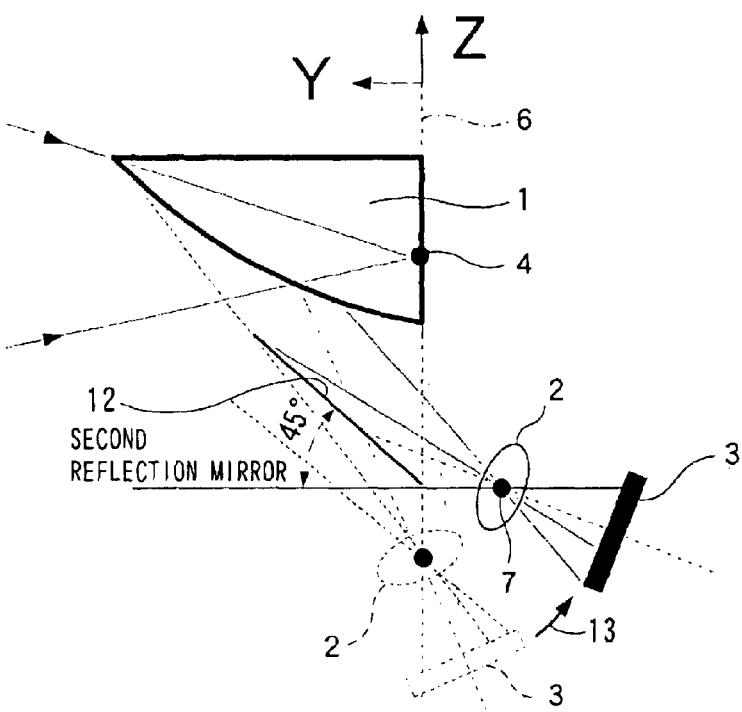
FIG. 8 is a phase diagram indicating a position of an object imaged by the wide-angle imaging device of (Embodiment 2), with the wide-angle imaging device of FIG. 7 being observed in the X axis direction.

FIGS. 7 and 8 show (Embodiment 2) which is different from (Embodiment 1) in that a second reflection mirror 12 is interposed between a reflection mirror 1 and an image forming lens 2.

The second reflection mirror 12 is formed by a flat mirror and is tilted by 45 degrees on a rotation center axis 6 of the reflection mirror 1 (first reflection mirror) in FIG. 8. The second reflection mirror 12 changes an optical path of a light beam, which is reflected from the first reflection mirror 1, to a direction (negative direction of the Y axis) opposite from a reference optical axis direction (Y axis direction). The position of an imaging element 3 is moved from a broken line of (Embodiment 1) to a solid line along the direction of an arrow 13. The wide-angle imaging device can be reduced in height along the Z-axis direction as compared with (Embodiment 1).

Further, since a light beam reflected on the reflection mirror 1 is reflected on the second reflection mirror 12 and is emitted into the imaging element 3, an erect image is formed by two reflections and thus the object can be readily recognized.

(Embodiment 3)

Figure 9:
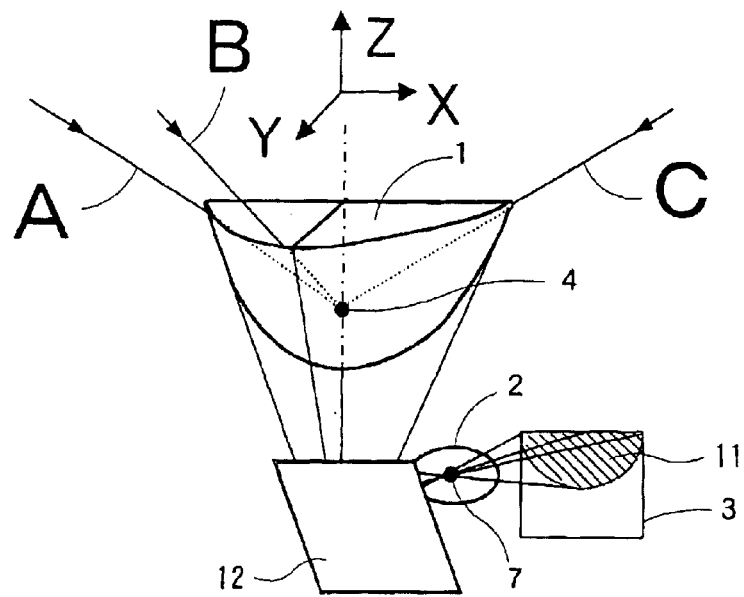
FIG. 9 is a schematic perspective view showing a wide-angle imaging device according to (Embodiment 3) of the present invention.
Figure 10:
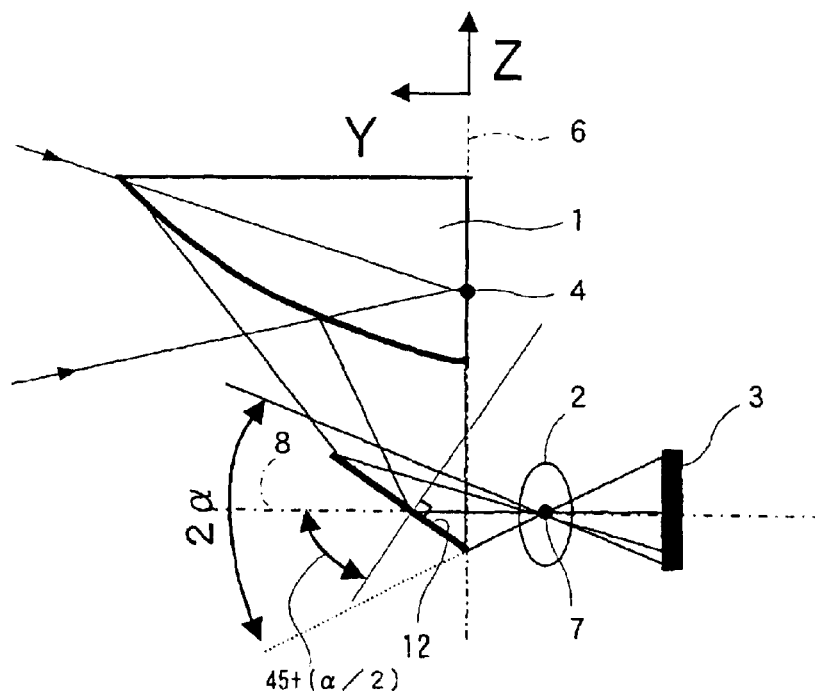
FIG. 10 is a phase diagram indicating a position of an object imaged by the wide-angle imaging device of (Embodiment 3), with the wide-angle imaging device of FIG. 9 being observed in the Z axis direction.

FIGS. 9 and 10 show (Embodiment 3) which is different from (Embodiment 2) in inclination of a second reflection mirror 12, and the position of an imaging element 3 is changed accordingly.

An optical axis 8 of the imaging element 3 and a rotation center axis 6 of a reflection mirror 1 intersect with each other. In order to arrange a semicircular image 11 on an imaging surface 5 of the imaging element 3, the second reflection mirror 12 is tilted by 45+(α/2) degrees with respect to the optical axis 8 of the imaging element 3 around the X axis.

With this configuration, the center of the reflection mirror 1 forms an image on an end (an upper end in FIG. 9) of the imaging surface 5 and a magnification of the image forming lens 2 is suitably selected, thereby obtaining an image which is vertically flipped from FIG. 4 of (Embodiment 1).

(Embodiment 4)

FIGS. 11 and 12 show (Embodiment 4).

Figure 12A:
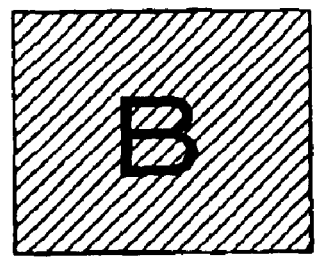
FIG. 12 illustrates contents on display screens in a standard state and a wide-angle state, respectively, according to the embodiment.
Figure 12B:
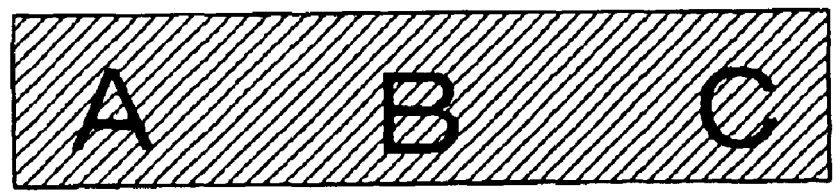

A wide-angle imaging device of (Embodiment 4) can be switched to a wide angle state for performing imaging with an angle field of 180 degrees via a reflection mirror 1 as (Embodiment 3) and a standard state for emitting a beam into an imaging element 3 via an image forming lens 2 instead of the reflection mirror 1. FIG. 12(b) shows the contents of an image displayed on a display device 15. The image is obtained by performing geometrical transformation on the output of the imaging element 3 in the wide angle state by using a camera processing circuit 14 and converting the output into a panoramic image of 180 degrees.

Since reflection is made by the reflection mirror 1 in the wide angle state, a reflection image is obtained on an imaging surface 5. Meanwhile, the standard state has an image with a normal visual field as shown in FIG. 12(a).

A camera body 16 comprises the reflection mirror 1, the image forming lens 2, the imaging element 3, and a second reflection mirror 12 under the arrangement condition of (Embodiment 3). The second reflection mirror 12 is mounted via a turning device 17 and can be moved to a withdrawal position, which does not interfere with the view of the imaging element 3, as indicated by the position of a solid line and a virtual line. The image forming lens 2 can change its position in the optical axis direction between the wide angle state and the standard state.

The position of the image forming lens 2 and the turning of the turning device 17 are managed by a focal position control circuit 18. As to the focus of the image forming lens 2, an imaginary object point is set near the reflection mirror 1 in the wide angle state. In the standard state, the second reflection mirror 12 is moved to the withdrawal position, and the position of the image forming lens 2 is changed so as to attain focus on a relatively far position.

An output signal of the imaging element 3 is subjected to transformation via the camera processing circuit 14 and is displayed on the display device 15.

In (Embodiment 4), the second reflection mirror 12 is turned by the turning device 17 so as not to interfere with a normal visual field. The following configuration is also applicable: instead of using the turning device 17, for example, in the case of the standard state, the second reflection mirror 12 is moved from the position of FIG. 11 along the X-axis direction (the paper face direction of FIG. 11) so as not to interfere with the normal visual field.

(Embodiment 5)

Figure 13:
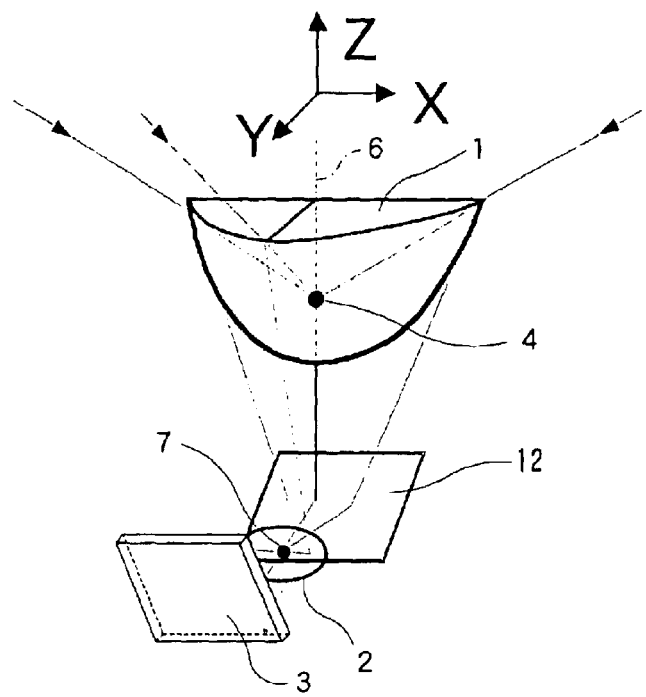
FIG. 13 is a schematic perspective view showing a wide-angle imaging device according to (Embodiment 5) of the present invention.
Figure 14:
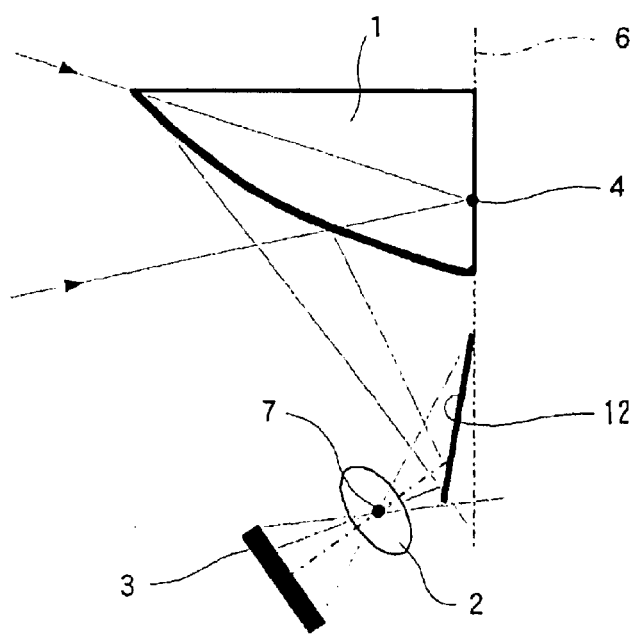
FIG. 14 is a phase diagram indicating a position of an object imaged by the wide-angle imaging device of (Embodiment 5), with the wide-angle imaging device of FIG. 13 being observed in the Z axis direction.
Figure 15:
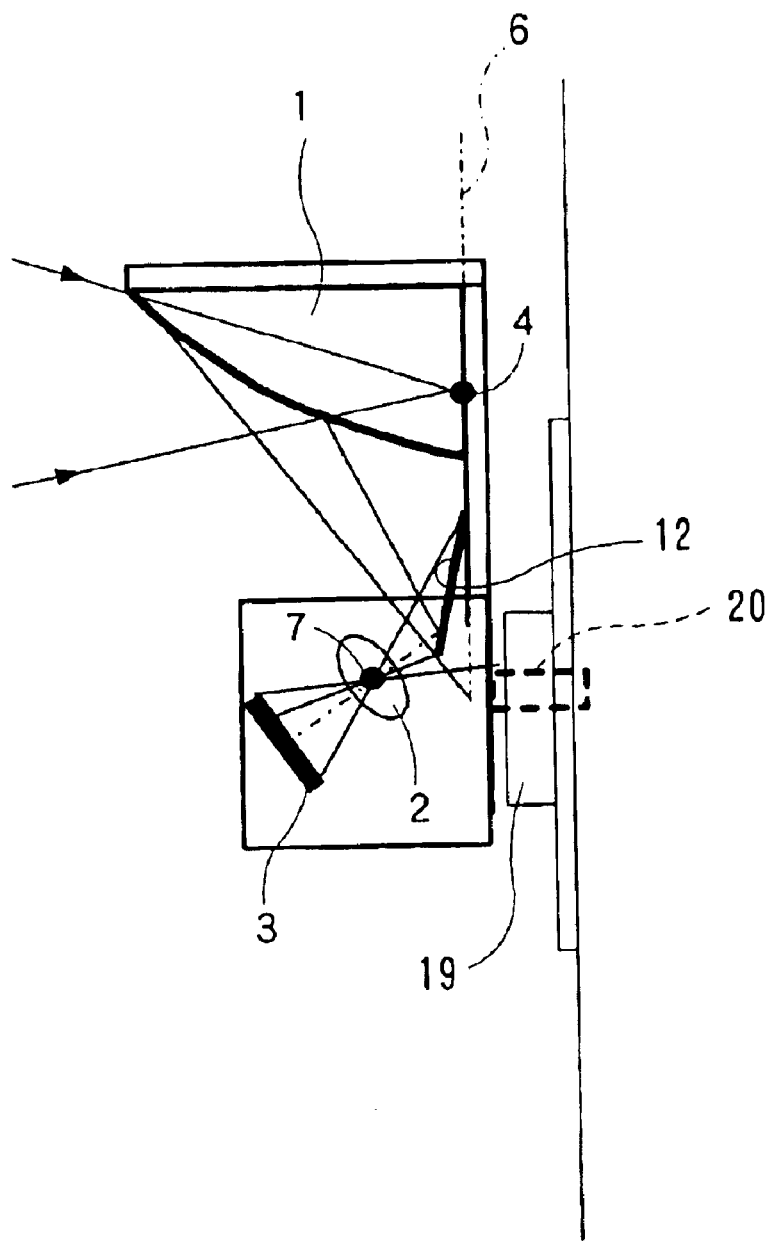
FIG. 15 is a main part sectional view showing a specific usage pattern of the wide-angle imaging device of the embodiment.

FIGS. 13 to 15 show (Embodiment 5).

A wide-angle imaging device of (Embodiment 5) is configured so that the reflection surface of the second reflection mirror 12 of (Embodiment 2) is reversely disposed and the position of an imaging element 3 is changed accordingly. The other parts are the same as those of (Embodiment 2).

As shown in FIGS. 13 and 14, an angle of the second reflection mirror 12 is set so as to form the same image as FIG. 4 of (Embodiment 1) on the imaging surface of the imaging element 3. The whole device including an image forming lens 2 and the imaging element 3 is not disposed behind a rotation center axis 6 of a reflection mirror 1, that is, the image forming lens 2 and the imaging element 3 are disposed on a positive position of the Y axis.

With this configuration, a focus of the reflection surface is located near the back of the wide-angle imaging device, and when the device is mounted on an interior wall and so on, a 180-degree visual field can be provided from a position extremely close to the wall, thereby substantially eliminating a blind spot. Instead of an interior wall, the device may be installed into a front panel of a refrigerator to monitor the room.

Moreover, as shown in FIG. 15, it is possible to achieve a wide-angle imaging device which can be used while being plugged into a wall outlet 19. In this case, the wide-angle imaging device can be supported by a plug 20 which is plugged into the wall outlet 19, the inside of the wide-angle imaging device can be fed from the plug 20, and a taken image can be transmitted by multiplex transmission through the plug 20 and interior wiring.

(Embodiment 6)

Figure 16A:
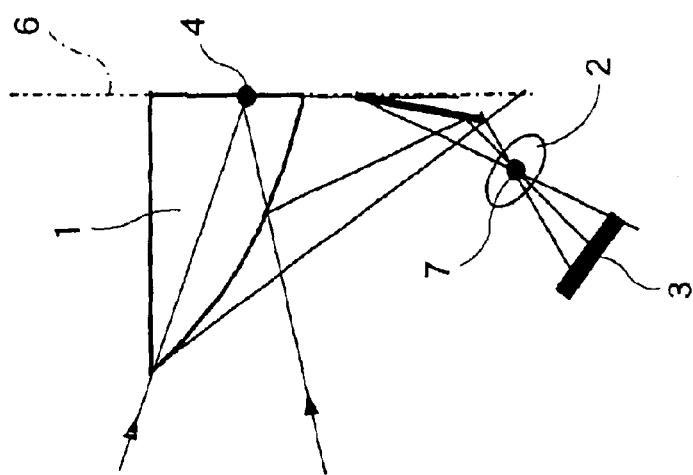
FIG. 16 shows a side section taken along line Y-Z when an imaging surface of a wide-angle imaging device according to (Embodiment 6) of the present invention is shifted from the optical axis of an image forming lens.
Figure 16B:
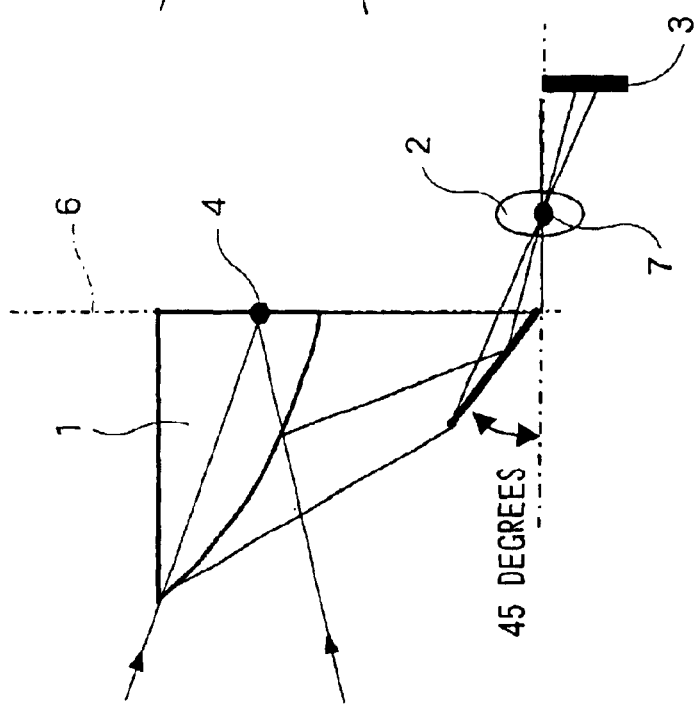
Figure 16C:
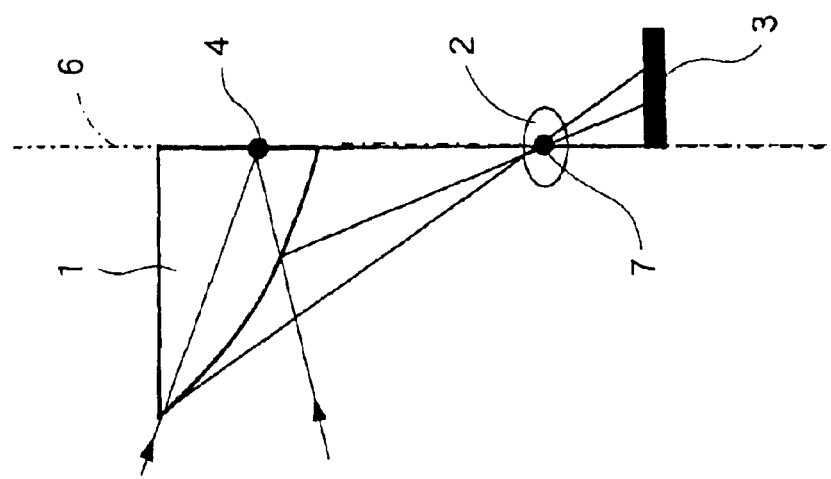

FIGS. 16(a), 16(b), and 16(c) show (Embodiment 6).

A wide-angle imaging device of (Embodiment 6) shows specific examples where the imaging surfaces of the above embodiments are shifted from the optical axis of an image forming lens 2.

In FIG. 16(a), the optical axis of the image forming lens 2 coincides with a rotation center axis 6 of a reflection mirror 1 and the position of an imaging element 3 is shifted to efficiently receive light as FIG. 4.

In FIG. 16(b), a second reflection mirror 12 is set at 45 degrees and the position of the imaging element 3 is shifted so that a light beam from the rotation center axis 6 of the reflection mirror 1 is received on an end of an imaging surface 5 of the imaging element 3, thereby efficiently receiving light as FIG. 4. FIG. 16(c) is similar to FIG. 16(b), though the second reflection mirror 12 is differently directed with a different angle.

In this way, an optical arrangement can be achieved with relative ease whereby light can be received efficiently as FIG. 4 while the optical axis of the image forming lens 2 coincides with the rotation center axis of the reflection mirror 1.

(Embodiment 7)

Figure 17:
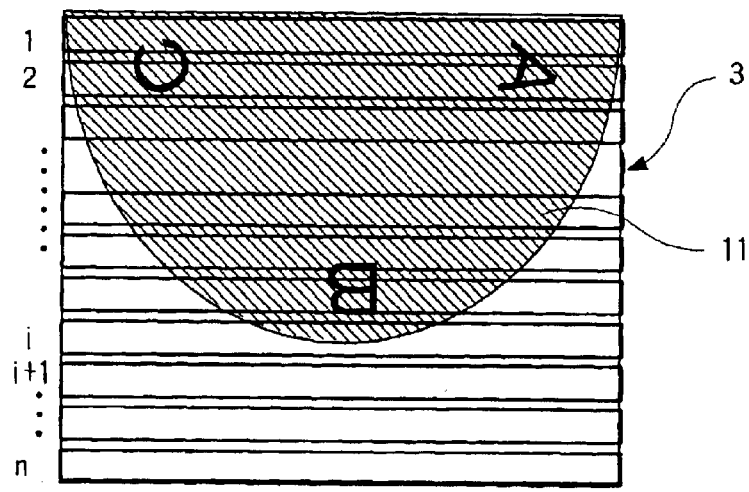
FIG. 17 is an enlarged plan view of an imaging surface for explaining output signal processing of an imaging element 3 according to (Embodiment 7) of the present invention.
Figure 18:
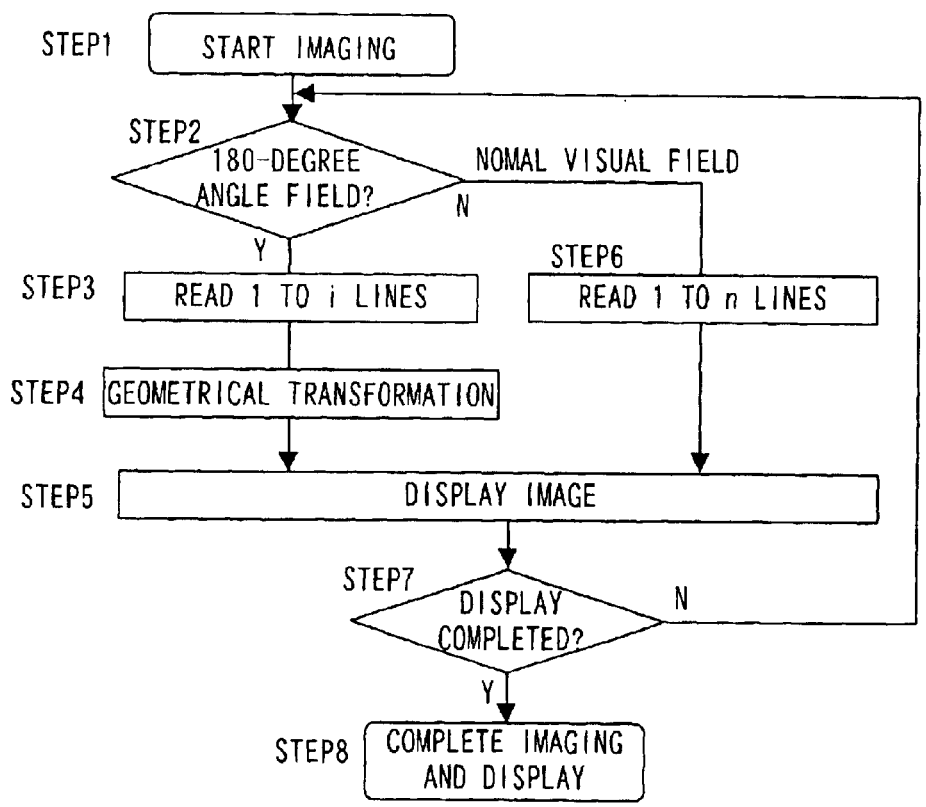
FIG. 18 is a flowchart showing (Embodiment 7) of the present invention.

FIGS. 17 and 18 show (Embodiment 7).

(Embodiment 7) shows a specific example of processing of an output signal on an imaging element 3 according to the above embodiments.

FIG. 17 shows the position of a semicircular image on the imaging element 3. Further, horizontal lines indicate reading/scanning lines 1 to n. Besides, in the above embodiments, the diameter position of the semicircular image is placed on the scanning starting line of the imaging element 3. Therefore, although an image may be flipped laterally depending upon the absence and presence of a second reflection mirror 12, the effect of the present embodiment is not changed.

Instead of reading all the reading/scanning positions of the imaging element 3, a camera processing circuit sequentially scans and reads the reading/scanning lines 1 to i and returns to the reading/scanning line 1 to repeat reading. Reading is not performed on the reading/scanning lines (i+1) to n.

With this configuration, a transformed image can be outputted promptly.

Figure 22:
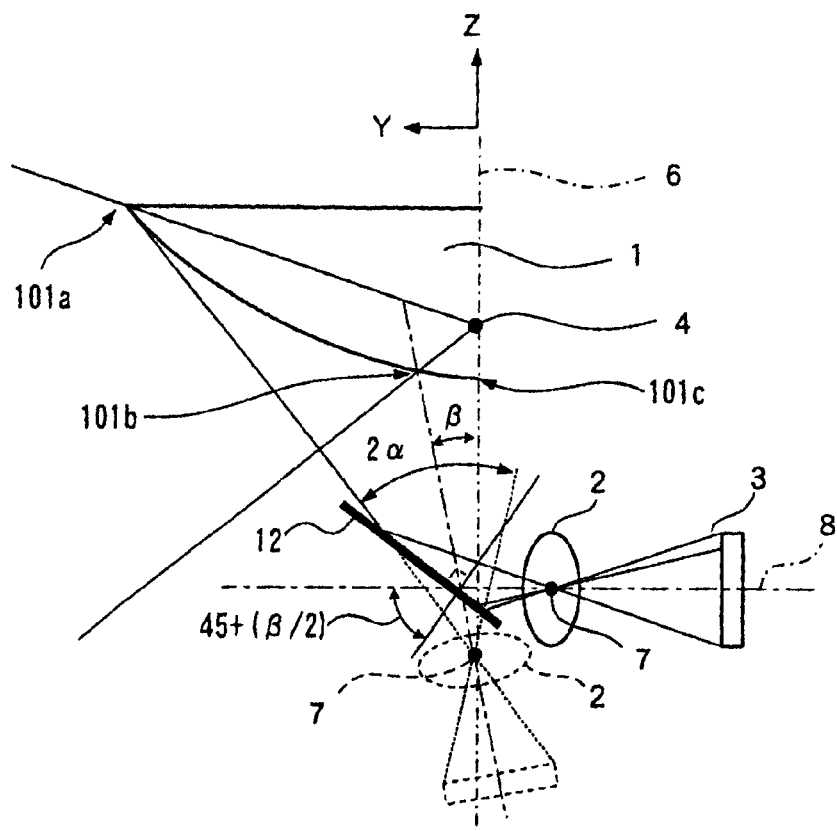
FIG. 22 is a schematic diagram showing an optical arrangement of a wide-angle imaging device according to (Embodiment 9) of the present invention.

Further, in addition to the reading operation, in the case of (Embodiment 4) shown in FIGS. 11 and 22, the operation is performed according to the flowchart of FIG. 18.

Imaging is started in step S1, and a wide-angle state or a standard state is decided in step S2.

When the wide-angle state is detected in step S2, the reading/scanning lines 1 to i are sequentially scanned and read in step S3 as described above. Geometrical transformation is performed in step S4, and a generated panoramic image is displayed in step S5.

When the standard state is detected in step S2, the reading/scanning lines 1 to n are sequentially scanned and read in step S6 and an image is displayed in step S5.

When step S5 is completed, it is decided whether display is completed or not in step S7. When the display is not completed, the process returns to step S2 to repeat the above routine. When completion of display is detected in step S7, step S8 is performed to complete the display.

A camera processing circuit 14 is configured so that the processing time of the geometrical transformation in step S4 is within time for scanning (i+1) to n in an unnecessary area other than an effective area.

With this configuration, as to an image formed like a semicircle, only necessary scanning is performed and geometrical transformation is performed in the remaining time, thereby outputting a panoramic image substantially in real time.

(Embodiment 8)

Figure 19:
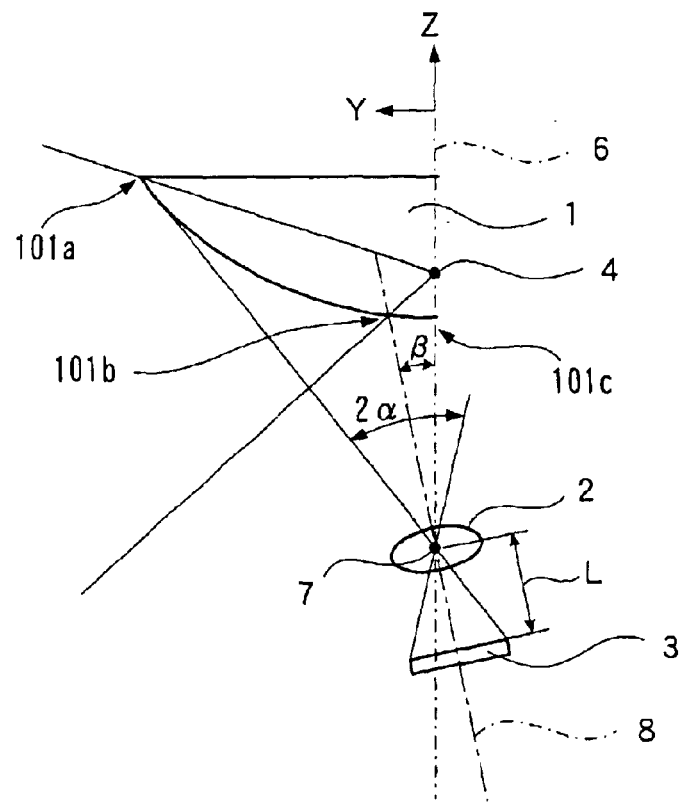
FIG. 19 is a schematic diagram showing an optical arrangement of a wide-angle imaging device according to (Embodiment 8) of the present invention.
Figure 20:
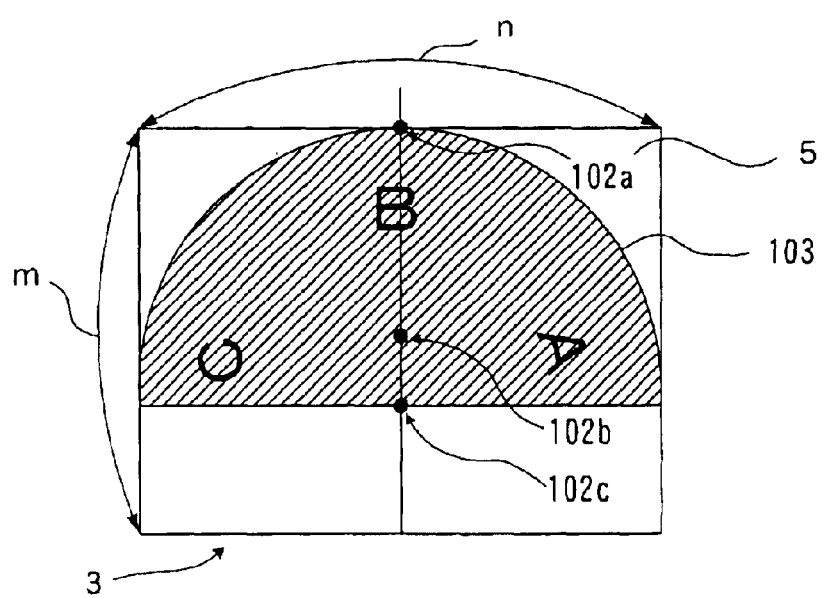
FIG. 20 is a plan view showing an imaging surface of the embodiment.
Figure 21:
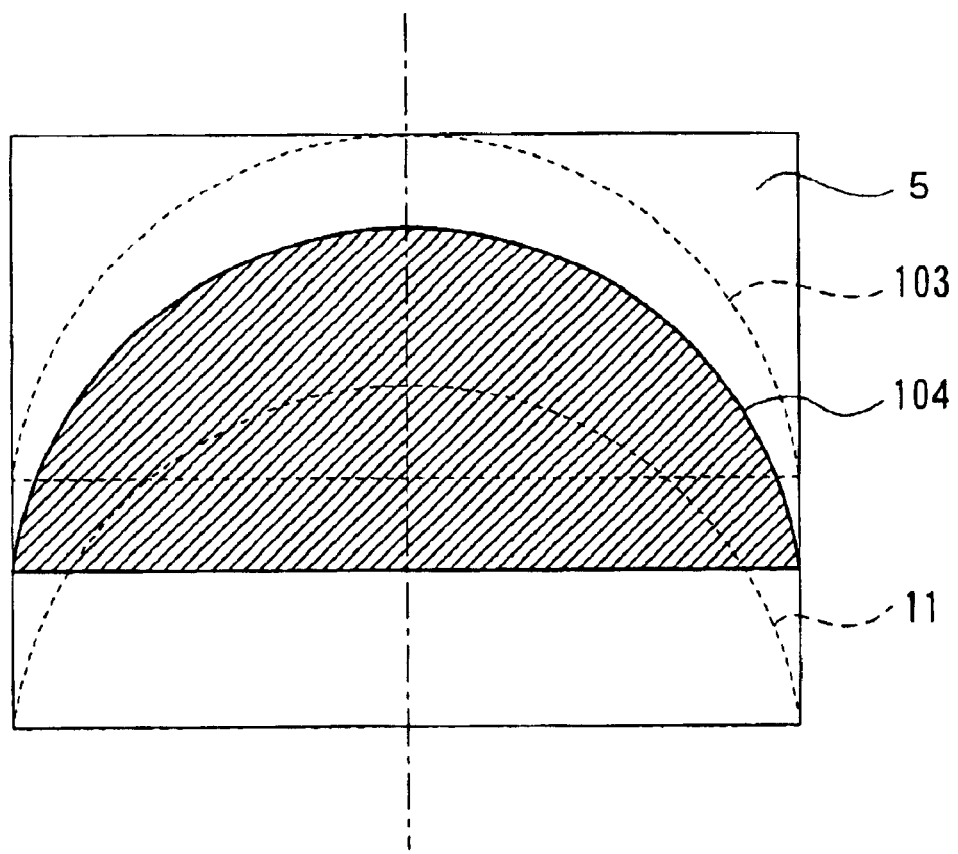
FIG. 21 is a plan view showing another example of the imaging surface of the embodiment.

FIGS. 19, 20, and 21 show (Embodiment 8) in which an angle formed by a rotation center axis 6 of a reflection mirror 1 and an optical axis 8 of an image forming lens 2 is different from that of (Embodiment 1).

FIG. 20 is a schematic diagram showing an image-forming state on an imaging surface 5 of an imaging element 3 of (Embodiment 8). Reference numeral 103 denotes an image formed by reflection of the reflection mirror 1. Reference character n denotes a length of a long side of the imaging surface 5 and reference character m denotes a length of a short side of the imaging surface 5.

In FIG. 19, reference character L denotes a distance between a principle point 7 and the imaging element 3 of the image forming lens 2 in the optical axis direction. $2\alpha$ indicates an angle field of the image forming lens 2 in a Y-Z plane, that is, an angle field in the short side direction of the imaging surface 5. When an angle $\beta$ is formed by the rotation center axis 6 and the optical axis 8 of the image forming lens 2, the following equation is established.

$$\tan \beta = [(n/m)-1] \cdot \tan \alpha \qquad \text{(Equation 101)}$$

In FIG. 19, a reflection beam from a point 101a on the outer periphery of the reflection mirror 1 passes through the image forming lens 2 and forms an image on a point 102a on the imaging surface 5 of the imaging element 3.

Moreover, the optical axis 8 of the image forming lens 2 and a reflection beam from an intersection point 101b of the reflection mirror 1 passes through the image forming lens 2 and forms an image on a point 102b of the imaging surface 5, and a reflection beam from a point 101c on the rotation center axis of the reflection mirror 1 passes through the image forming lens 2 and forms an image on a point 102c of the imaging surface 5. In this way, a light beam within approximately ±90 degrees forms an image on the imaging element 3 around the Z axis while the Y axis is placed at the center. As a result, an image having an angle field of approximately 180 degrees is substantially formed like a semicircle.

Here, in order to inscribe the image 103 of FIG. 20 in the imaging surface 5 and contact the point 102a with the endpoint of the imaging surface 5, a distance equal to m/2 of the imaging surface 5 is required between the image forming point 102b of a reflection beam on the optical axis 8 of the image forming lens 2 and the image forming point 102a of the point 101a on the outer periphery of the reflection mirror 1. Therefore, an image with an angle field being half of $2\alpha$ is formed over a distance of m/2. $2\alpha$ is an angle field in the Y axis direction. Based on the geometrical relationship of FIG. 19, the following equation is established.

$$L \cdot \tan \alpha = m/2 \qquad \text{(Equation 102)}$$

Meanwhile, since the radius of the image 103 is half the long side n of the imaging surface 5, between the point 102 where a reflection beam from the point 101c on the rotation center axis of the reflection mirror 1 forms an image and the point 102a which is an image-forming point of the point 101a on the outer periphery of the reflection mirror 1, the distance is half the long side n of the imaging surface 5. Therefore, based on the geometrical relationship, the following equation is established.

$$L \cdot \tan \beta = (n/2) - (m/2) \quad \text{(Equation 103)}$$

(Equation 101) is derived from (Equation 102) and (Equation 103). Therefore, when the optical axis of the image forming lens 2 is tilted by an angle β and a magnification of the image forming lens 2 is selected so as to establish (Equation 101), an image with an angle field of 180 degrees can be formed so that an arc-shaped part of the semicircular part substantially makes contact with the three sides of the imaging surface 5.

When an image is formed under the condition for establishing (Equation 101), a length of the image 103 in the X direction, that is, a length of a long side of the imaging surface 5 is longer than that of the Y direction by (1/cos β) times. Therefore, although a semicircular image slightly expands beyond the imaging surface 5 in the X direction, no problem arises in practical use because β is relatively small.

In FIG. 20, the semicircle image 103 is inscribed in the imaging surface 5. Inscribing is not always necessary as long as an image is formed so that the radius of the semicircular image 103 is approximately half the long side n of the imaging surface 5. Namely, as shown in FIG. 21, even when the image 103 is formed on an image forming position 104 of the imaging surface 5, an image with an angle field of 180 degrees can be effectively formed on the imaging surface. For comparison, FIG. 21 shows the image-forming position of the semicircular image 11 of (Embodiment 1).

As long as the size of the whole device is not considered, in order to dispose the largest image with an angle field of 180 degrees, that is, an image with a high resolution on the rectangular imaging surface 5, it is preferable that the rotation axis center of the reflection mirror 1 is imaged on the median of the long side of the imaging surface 5 and the radius of the semicircular image is imaged with a length substantially half the long side of the imaging surface 5.

Therefore, when an angle field in the Y-Z plane of the image forming lens 2, that is, an angle field in the short side direction of the imaging surface 5 is 2α and an angle τ is formed by the optical axis direction of the image forming lens 2 and the rotation center axis 6 of the reflection mirror 1 on the Y-Z plane, it is preferable that τ is smaller than or equal to a slope angle α of (Embodiment 1) and is larger than or equal to β of (Equation 101). Namely, it is preferable that τ is within the range of the following (Equation 104).

$$\alpha \geq \tau \geq \tan^{-1}[(n/m - 1) \cdot \tan \alpha] \quad \text{(Equation 104)}$$

For example, the image forming lens 2 has an angle field 2α=40 degrees, the imaging surface has a long side length n=4 [mm] and a short side length m=3 [mm]. In this case, the following relationship is established.

$$20° \geq \tau \geq 6.91°$$

As shown in FIG. 19, as becomes larger, an optical system is tilted. Thus, the optical system increases in size in the Y axis direction. Therefore, the optical arrangement is provided so as to satisfy (Equation 101), so that the image forming lens 2 decreases in slope angle as compared with (Embodiment 1), thereby achieving a smaller device.

(Embodiment 9)

Figure 23:
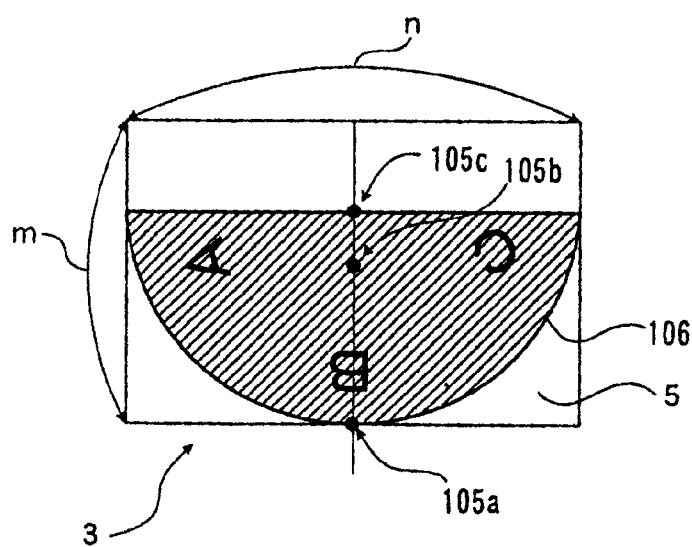
FIG. 23 is a plan view showing an imaging surface of the embodiment.

FIGS. 22 and 23 show (Embodiment 9).

In (Embodiment 8), the position of a semicircular image on the imaging surface 5 is changed from that of (Embodiment 1). In (Embodiment 3) using the second reflection mirror 12, the position of a semicircular image on the imaging surface 5 can be changed similarly.

To be specific, FIG. 22 is a Y-Z sectional view showing the optical system of (Embodiment 9). FIG. 22 shows an optical arrangement in which a second reflection mirror 12 is interposed between a reflection mirror 1 and an image forming lens 2 as (Embodiment 3) and an image with an angle field of 180 degrees is inscribed in an imaging surface 5 as (Embodiment 8).

Here, when the optical axis direction of the image forming lens 2 is caused to coincide with the Y axis direction, in order to inscribe an image with an angle field of 180 degrees on the imaging surface 5, the arrangement is made on the Y-Z plane so that an angle of 45+(β/2) is formed between the direction of the normal on a surface of the second reflection mirror 12 and the optical axis of the imaging element 3. β is calculated by (Equation 101) of (Embodiment 8).

With such an optical arrangement, a reflection beam from an intersection point 101b of the optical axis 8 of the image forming lens 2 and the reflection mirror 1 changes its optical path to a direction corresponding to the Y-axis direction by the second reflection mirror 12. As shown in FIG. 23, an image is formed on a center 105b of the imaging surface 5. Further, a reflection beam from a point 101a on the outer periphery of the reflection mirror 1 passes through the image forming lens 2 and forms an image on a point 105a on the imaging surface 5. A reflection beam from a point 101c on the rotation center axis of the reflection mirror 1 passes through the image forming lens 2 and forms an image on a point 105c on the imaging surface 5.

Therefore, since the image forming lens 2 is disposed horizontally and the second reflection mirror 12 is provided, an image flipped vertically and horizontally from FIG. 20 can be obtained as shown in FIG. 23. Thus, as with (Embodiment 2), the configuration can be compact in the Z-axis direction.

(Embodiment 9) shows an optical arrangement in which an image with an angle field of 180 degrees is inscribed in the imaging surface 5. Inscribing is not always necessary as long as a radius of a semicircular image is approximately half the long side of the imaging surface 5. Therefore, on the Y-Z plane, the second reflection mirror 12 is set at an installation angle between an installation angle of the second reflection mirror 12 of (Embodiment 3) and a set angle for forming an angle of 45+(β/2) degrees between the direction of the normal on a surface of the second reflection mirror 12 and the optical axis of the imaging element 3, and the diameter of a semicircular image is substantially equal to the length of the long side of the imaging surface 5. In this case, the semicircular image can be effectively formed on the imaging surface 5.

Besides, this arrangement can be similarly carried out in (Embodiment 5).

(Embodiment 10)

Figure 24A:
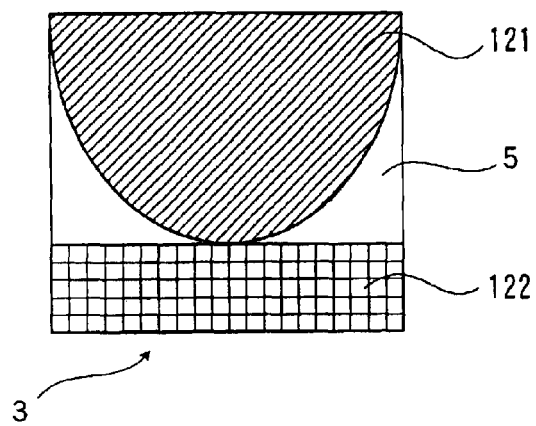
FIG. 24 illustrates timing of geometrical transformation of a wide-angle imaging device according to (Embodiment 10) of the present invention.
Figure 24B:
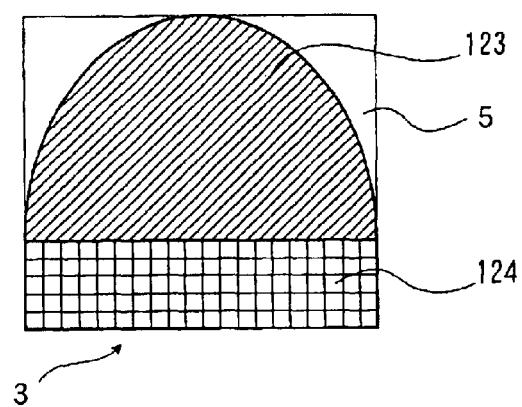
Figure 24C:
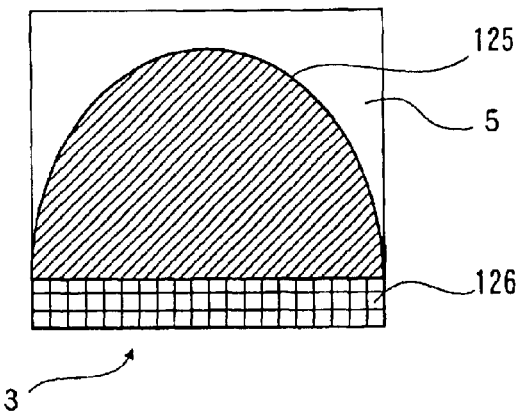

FIGS. 24(b) and 24(c) show (Embodiment 10).

Each of FIGS. 24(b) and 24(c) shows an area for forming an image with an angle field of 180 degrees on the imaging surface 5 of the imaging element 3 in the above embodiments.

An area 121 of FIG. 24(a) shows, for example, the optical arrangement of (Embodiment 1), that is, the arrangement in which the center of a semicircular image forming area is positioned on a midpoint of a long side of the imaging surface 5.

An area 123 of FIG. 24(b) is, for example, an image forming area which is obtained by the optical arrangement of (Embodiment 8). The semicircular image forming area is inscribed in the imaging surface 5.

FIG. 24(c) shows that an image-forming area 125 is formed between the positions of FIG. 24(a) and FIG. 24(b).

(Embodiment 7) described that in the case of the image forming state of FIG. 24(a), geometrical transformation is performed within time for scanning unnecessary areas 122. This holds true for FIGS. 24(b) and 24(c). In the case of FIG. 24(b), geometrical transformation is performed within time for scanning unnecessary areas 124, and in the case of FIG. 24(c), geometrical transformation is performed within time for scanning unnecessary areas 126. Thus, a converted image can be outputted promptly in any of the cases.

(Embodiment 11)

Figure 25:
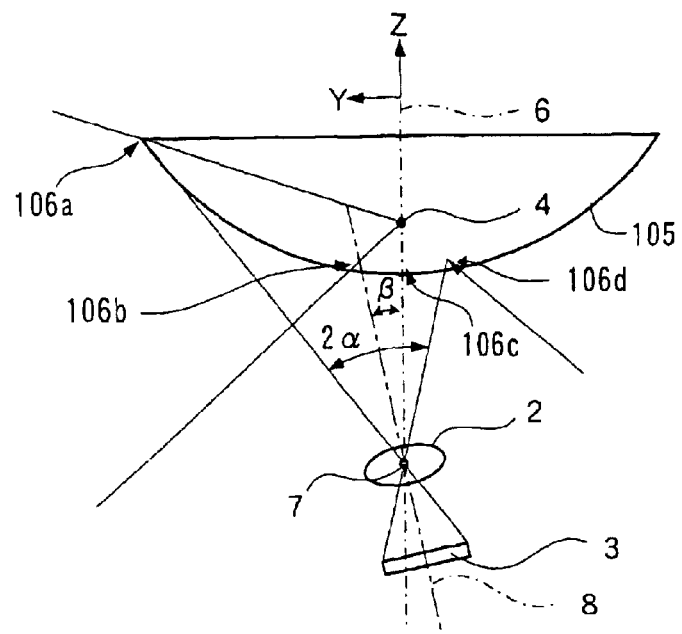
FIG. 25 is a schematic diagram showing an optical arrangement of a wide-angle imaging device according to (Embodiment 11) of the present invention.
Figure 26:
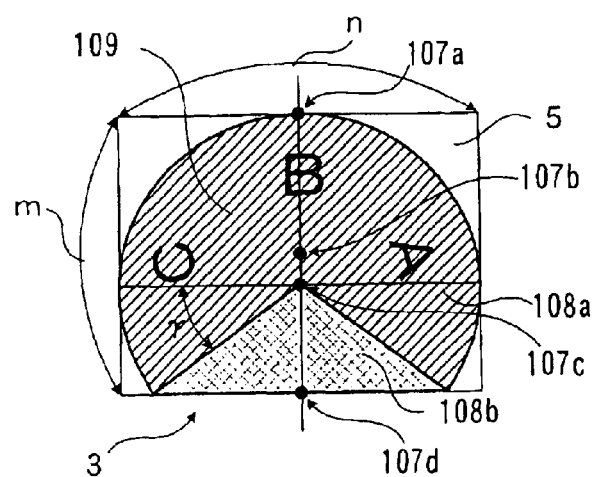
FIG. 26 is a plan view showing an imaging surface of the embodiment.
Figure 27:
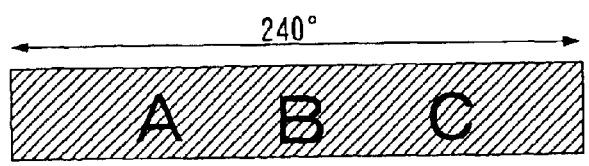
FIG. 27 illustrates a panoramic image after geometrical transformation according to the embodiment.

FIGS. 25, 26, and 27 show (Embodiment 11).

While the reflection mirror 1 of (Embodiment 8) has a 180-degree convex shape around the rotation center axis, a reflection mirror 105 of FIG. 25 has a reflection surface of a convex shape exceeding 180 degrees with respect to a reference optical axis direction around the rotation center axis of a rotary symmetrical body, to be specific, the reflection mirror 105 has a 360-degree rotary symmetrical body around a rotation center axis 6. $2\alpha$ represents an angle field in the Y-Z plane of an image forming lens 2, that is, an angle field in the short side direction of an imaging surface 5. When an angle formed by the rotation center axis 6 and an optical axis 8 of the image forming lens 2 on the Y-Z plane is expressed by $\beta$, the image forming lens 2 and the imaging element 3 are arranged so as to establish (Equation 101).

FIG. 26 is an enlarged plan view showing the imaging surface 5 of the imaging element 3. Since the reflection mirror 105 is a rotary symmetrical body as shown in FIG. 25, a part of a 360-degree reflection beam forms an image on the imaging surface. Areas 108a and 108b indicate formed images.

As shown in FIG. 25, unlike (Embodiment 8), since the reflection mirror 105 is a 360-degree rotary symmetrical body, in addition to points 106a, 106b, and 106c on the reflection mirror 105, a light beam from a point 106d also passes through the image forming lens 2 and forms an image on the imaging element 3.

A reflection beam from the point 106a forms an image on a point 107a, a reflection beam from the point 106b forms an image on a center 107b of the imaging surface 5 because the point 106b is disposed on the optical axis of the image forming lens 2, a reflection beam from the point 106c forms and image on a point 107c, and a reflection beam from the point 106d forms an image on a point 107d. Therefore, images are formed on the areas 108a and 108b of FIG. 26.

The following will discuss an angle field of a formed image around the Z axis.

$\gamma$ of FIG. 26 represents an angle field permitting formation of an image exceeding 180 degrees in the present embodiment. $\gamma$ is determined by an aspect ratio of the imaging surface 5. Since a length of a long side is n and a length of a short side is m on the imaging surface 5, the following equation is established.

$$\sin \gamma = (2m-n)/n$$

For example, in the case of the imaging element 3 where the most typical ratio of a long side and a short side is 4:3, $(2m-n)/n=0.5$ is established. Thus, $\gamma$ is 30 degrees. Thus, in the case of a CCD having an aspect ratio of 4:3, an angle field of approximately 180 degrees+2×30=240 degrees is obtained. Hence, an image with a wider angle field exceeding 180 degrees can be imaged while maintaining an effective utilization ratio of the imaging surface at an angle field of 180 degrees as (Embodiment 1).

FIG. 27 shows an example for converting an image on the area 108b of FIG. 26 to a panoramic image. It is possible to obtain a panoramic image having an angle field of 180 degrees or more in the direction of the arrow. The conversion can be performed by the same operation as that of the camera processing circuit 14 of (Embodiment 4).

Thus, according to the present embodiment, an image with an angle field of more than 180 degrees can be imaged at a time, and the image can be effectively arranged on the rectangular imaging surface 5.

Although the embodiment described that the reflection mirror 105 is a complete rotary symmetrical body of 360 degrees, a reflection mirror is acceptable as long as a reflection part is provided on a part of a rotary symmetrical body so as to correspond to an angle field which can be imaged around the rotation center axis. However, in view of manufacturing of the reflection mirror, a rotation symmetrical shape of 360 degrees is desirable.

As described above, the wide-angle imaging device of the present invention is configured so that a light beam reflected on a first reflection mirror, which has a reflection surface of an approximately ±90-degree convex shape around a rotation center axis of a rotary symmetrical body with respect to a reference optical axis direction, is directly imaged by an imaging device or is imaged via a second reflection mirror disposed on an optical path between the first reflection mirror and the imaging device. Thus, it is possible to efficiently use pixels of an imaging element in the imaging device having a monitor area of about 180 degrees, thereby obtaining a high-quality image.

Further, the wide-angle imaging device of the present invention comprises a first reflection mirror having a reflection mirror of a convex shape exceeding 180 degrees around the rotation center axis of a rotary symmetrical body with respect to a reference optical axis direction and an imaging device which has a principle point on the rotation center axis of the first reflection mirror and forms an image of a reflection beam from the first reflection mirror to perform imaging. The rotation center axis of the first reflection mirror is configured so that an image is formed substantially on a midpoint along the long side of the imaging surface and a circular reflection beam from the first reflection mirror has a diameter substantially equal to the long side of the imaging surface. Thus, it is possible to efficiently use pixels of an imaging element in the imaging device having a wide-angle monitor area exceeding 180 degrees, thereby obtaining a high-quality image.

What is claimed is:

1. A wide-angle imaging device, comprising:
   a first reflection mirror having a reflection surface of an approximately ±90-degree convex shape around a rotation center axis of a rotary symmetrical body with respect to a reference optical axis direction; and
   an imaging device having a principle point of an image forming lens on a rotation center axis of the first reflection mirror, having an optical axis deviated from the rotation center axis of the first reflection mirror, forming an image of a reflection beam from the first reflection mirror, and imaging an object within approximately ±90 degrees around the rotation center axis of the first reflection mirror,
   wherein
   the first reflection mirror is a hyperboloid in shape having an internal focus on the rotation center axis, a position of an external focus of the hyperboloid and a position of the principle point of the image forming lens of the imaging device substantially coincide with each other, and when the imaging device has an angle field of 2α, an angle of about α is formed between the optical axis of the imaging device and the rotation center axis of the first reflection mirror, and the imaging device has an imaging surface that is rectangle and has a long side and a short side, the rotation axis center of the first reflection mirror forms an image substantially on a midpoint of the long side of the imaging surface, and a semicircular reflection beam from the first reflection mirror has a diameter equal to the long side of the imaging surface.

2. A wide-range imaging device, comprising:

a first reflection mirror having a reflection surface of an approximately ±90-degree convex shape around a rotation center axis of a rotary symmetrical body with respect to an arbitrary reference optical axis direction;

a second reflection mirror located on a rotation center axis of the first reflection mirror and changing an optical path of a reflection beam from the first reflection mirror in an opposite direction from the reference optical axis direction; and an imaging device forming an image of a reflection beam having an optical path changed by the second reflection mirror, the reflection beam having an optical axis being directed to the second reflection mirror instead of coinciding with the rotation center axis of the first reflection mirror, thereby to image an object within approximately ±90 degrees around the rotation center axis of the first reflection mirror, wherein the first reflection mirror is a hyperboloid in shape having an internal focus on the rotation center axis, and a position of an external focus of the hyperboloid and a principle point of an image forming lens of the imaging device substantially coincide with each other, the external focus being changed in position by the second reflection mirror, the optical axis of the imaging device substantially intersects the rotation center axis of the first reflection mirror and substantially coincides with an approximately 180-degree direction with respect to the reference optical axis direction of the first reflection mirror, when the imaging device has an angle field of 2α in the rotation center axis direction of the first reflection mirror, a normal to a surface of the second reflection mirror and the optical axis of the imaging device form a narrow angle of about 45+(α/2) degrees, and the imaging surface of the imaging device is rectangle and has a long side and a short side, the rotation axis center of the first reflection mirror forms an image substantially on a midpoint of the long side of the imaging surface, and a semicircular reflection beam from the first reflection mirror has a diameter equal to the long side of the imaging surface.

3. A wide-range imaging device, comprising a first reflection mirror having a reflection surface of an approximately ±90-degree convex shape around a rotation center axis of a rotary symmetrical body with respect to an arbitrary reference optical axis direction;

a second reflection mirror located on a rotation center axis of the first reflection mirror and changes an optical path of a reflection beam from the first reflection mirror in an opposite direction from the reference optical axis; and an imaging device forming an image of a reflection beam having an optical path changed by the second reflection mirror, the reflection beam having an optical axis being directed to the second reflection mirror instead of coinciding with the rotation center axis of the first reflection mirror, thereby to image an object within approximately ±90 degrees around the rotation center axis of the first reflection mirror, wherein the imaging device further comprises a moving device for moving the second reflection mirror, and the second reflection mirror is moved to directly image an object by the imaging device without forming an image of a reflection beam from the first reflection mirror in the imaging device.

4. The wide-range imaging device according to claim 3, further comprising an adjusting device for adjusting a focal position according to a position of the second reflection mirror moved by the moving device.

5. A wide-range imaging device, comprising:

a first reflection mirror having a reflection surface of an approximately ±90-degree convex shape around a rotation center axis of a rotary symmetrical body with respect to a reference optical axis direction;

a second reflection mirror located on a rotation center axis of the first reflection mirror and changes an optical path of a reflection beam from the first reflection mirror to the reference optical axis direction; and an imaging device forming an image of a reflection beam having an optical path changed by the second reflection mirror, the reflection beam having an optical axis being directed to the second reflection mirror instead of coinciding with the rotation center axis of the first reflection mirror, thereby to image an object within approximately ±90 degrees around the rotation center axis of the first reflection mirror, wherein the first reflection mirror is a hyperboloid in shape having an internal focus on the rotation center axis, and a position of an external focus of the hyperboloid and a position of a principle point of an image forming lens of the imaging device substantially coincide with each other, the external focus being changed in position by the second reflection mirror, the first reflection mirror, the second reflection mirror, and the imaging device are included in a space within approximately ±90 degrees around the rotation center axis of the rotary symmetrical body with respect to the reference optical axis direction, and the imaging device has an imaging surface that is rectangle and has a long side and a short side, the rotation axis center of the first reflection mirror forms an image substantially on a midpoint of the long side of the imaging surface, and a semicircular reflection beam from the first reflection mirror has a diameter equal to the long side of the imaging surface.

6. The wide-angle imaging device according to any one of claims 1 to 5, further comprising a camera processing circuit for scanning only an effective area on the imaging surface of the imaging device having imaged an object within approximately ±90 degrees around the rotation center axis of the first reflection mirror, thereby to perform geometrical transformation on an image of the effective area, and outputs the image.

7. The wide-angle imaging device according to claim 6, wherein the camera processing circuit completes the geometrical transformation within a time for scanning an unnecessary area other than the effective area.

8. A wide-angle imaging device, comprising:

a first reflection mirror having a reflection surface of a convex shape exceeding 180 degrees around a rotation center axis of a rotary symmetrical body with respect to a reference optical axis direction; and an imaging device having a principle point of an image forming lens on a rotation center axis of the first reflection mirror, having an optical axis deviated from the rotation center axis of the first reflection mirror, and forming an image of a reflection beam from the first reflection mirror to perform imaging, wherein the rotation axis center of the first reflection mirror forms an image substantially on a midpoint in a long side direction of the imaging surface, and a circular reflection beam from the first reflection mirror has a diameter substantially equal to a length of the long side of the imaging surface, and when the imaging surface of the imaging device has an angle field $2\alpha$ in a short side direction and the imaging surface of the imaging device has a long side n and a short side m, the optical axis of the imaging device and the rotation center axis of the first reflection mirror form an angle $\beta$ satisfying the equation of $\tan \beta = [(n/m)-1] \cdot \tan \alpha$.

9. The vide-angle imaging device according to claim 8, further comprising a camera processing circuit for retrieving an image of an area on the imaging surface, performing geometrical transformation to the image, and outputting the image, the image being formed from an object within approximately $\pm(90+\gamma)$ degrees around the rotation center axis of the first reflection mirror, wherein $\sin \gamma = (2m-n)/n$ is established.

* * * * *